United States Patent [19]

Oehlenschlaeger et al.

[11] Patent Number: 4,857,369
[45] Date of Patent: Aug. 15, 1989

[54] METHOD FOR THE CLOSING OF CONTAINERS

[75] Inventors: Ulla Oehlenschlaeger; Jan R. Pedersen; Erling Sörensen, all of Odense, Denmark

[73] Assignee: PLM AB, Malmo, Sweden

[21] Appl. No.: 133,612

[22] Filed: Dec. 14, 1987

[30] Foreign Application Priority Data

Dec. 18, 1986 [SE] Sweden .................................. 8605443

[51] Int. Cl.⁴ ............................................. B65D 43/02
[52] U.S. Cl. .................... 428/35.7; 428/36.92; 428/192; 428/212; 428/213; 428/349; 428/910; 215/232
[58] Field of Search ................. 428/35, 192, 212, 213, 428/349, 910, 35.7, 36.92; 156/69; 215/232

[56] References Cited

U.S. PATENT DOCUMENTS

| | | | |
|---|---|---|---|
| 3,296,046 | 1/1967 | Pouncy et al. | 156/82 |
| 3,361,607 | 1/1968 | Bruno | 156/82 |
| 3,388,019 | 6/1968 | Thigpen | 156/282 |
| 4,056,421 | 11/1977 | Jarvis | 156/272 |
| 4,379,014 | 4/1983 | Rausing et al. | 428/480 |
| 4,456,164 | 6/1984 | Foster | 428/35 |
| 4,497,406 | 2/1985 | Takanashi | 428/35 |

FOREIGN PATENT DOCUMENTS

| | | |
|---|---|---|
| 0127466 | 12/1984 | European Pat. Off. . |
| 2111857A | 7/1983 | United Kingdom . |
| 2151180A | 7/1985 | United Kingdom . |

Primary Examiner—Ellis P. Robinson
Assistant Examiner—James J. Seidleck
Attorney, Agent, or Firm—Roberts, Spiecens & Cohen

[57] ABSTRACT

A body (1) of oriented thermoplastic material is converted through heating in an area adjoining one boundary surface of the material portion to a layer (10) of substantially non-oriented material. A film (2) is fixed to the fixing layer (10) by pressing the film with a compression and heating element (50) and the necessary heat is supplied so that the film (2) will be fixed to the fixing layer (10). Since the film is bonded to substantially non-oriented plastic material, the desired detachability in the bond between the film and the material portion (1) is achieved.

6 Claims, 1 Drawing Sheet

METHOD FOR THE CLOSING OF CONTAINERS

FIELD OF THE INVENTION

The present invention relates to a method applicable to oriented plastic material for the detachable fixing of a foil or film to the material in a fixing aarea when the foil or film is made to rest against a boundary surface of the material and is fixed to it by the supply of energy, and it also relates to a closed container the opening part of which includes oriented material, where the container is closed by means of a film or foil.

BACKGROUND

In many applications it is necessary to fix a foil or a film in a tight and detachable manner to a base of plastic material which mainly consists of oriented material. In the following, without any restrictive significance, the designation film is used for the foil or film which is to be fixed to the base. The structure of the film varies from occasion to occasion and is constituted in certain applications of a single-layer film, e.g. of plastic material or of metal, and in other applications of a laminated film. In laminated film the layers consist, for example, simply of plastic material when the composition of the material as a rule varies from layer to layer whilst in other applications one or more of the layers consist of metallic material, of barrier material etc. The side of the film which is to be fixed to the base, however, is always made up of a material suitable for being fixed to the base by means of heating.

It has been found, surprisingly, that it is not possible in the case of certain plastic material, e.g. polyethylene terephtalate (PET) or material similar to it, to fix film to a base when this consists of oriented plastic material and to form a bond therewith which is both tight and detachable. It is found that with previously known and conventionally applied fixing techniques, where the film is pressed to the base by mechanical means and at the same time energy is supplied to the film, it is certainly possible to fix the film to the base in a tight bond, but that the tight bond sought is obtained only if the energy supply (heat supply) takes place on a scale which causes the film to be fixed to the base so strongly that subsequently it cannot be torn off. This means, of course, that the combination of film of the aforementioned type and oriented material in the opening part of a container of plastic material cannot be used for a package (container) where easy opening is required, i.e. containers for foodstuufs, such as dairy products. A further problem is that the film becomes defored when the energy supply is so great that a tight bond is achieved.

The product obtained, for example, a cup with oriented material at the opening is closed by means of a film, is therefore not acceptable, since on the one hand the film is defored to an extent which makes the container unacceptable to the consumer, whilst on the other hand the film sticks to the edge of the opening so strongly that it cannot be torn off.

SUMMARY OF THE INVENTION

The present invention has as its object a method and to a container where the abovementioned problem and inconveniences are eliminated. This object is achieved in that oriented material included in the prospective fixing area is heated, before the foil or film is moved to rest against the material portion, through the supply of energy, to a temperature in the region of, or exceeding, the temperature at which reduction of the orientation of the material commences so that material which had been oriented before the heating is converted to a substantially non-oriented material, the foil or film is then moved so as to rest with its boundary surface against a fixing surface of the material portion and by heating the material in connection with the contact surfaces the film or foil is fixed to the material portion, and the oriented material of the container in an all-around opening area in a cross-section through the material has a fixing layer integrated with the oriented material and/or that the film has a fixing layer of substantially non-oriented material facing the oriented material for bonding the film to the oriented material.

It is essential for the invention that in the base of plastic material a fixing layer of substantially non-oriented material is formed, this layer constituting the connecting layer between the oriented material of the base and the film. Since the fixing layer consists of substantially non-oriented material it is possible to employ conventional techniques for fixing the foil to the base and achieve the desired detachability.

For the formation of the fixing layer of substantially non-oriented material, energy is supplied to the fixing area, for example, by a mechanical means comprising a contact surface which at a temperature in the region of, or exceeding, the temperature at which reduction of the orientation of the material of the fixing layer commences, rests against the prospective fixing surface during a certain time period.

In other applications, the heating is done in that the prospective fixing surface is subjected to a radiation of a frequency or composition so that the plastic material in the fixing layer hinders the radiation from passing the fixing layer, e.g. optical radiation or thermal radiation. Heating by means of a flame is also applied in certain embodiments.

In a preferred application, the technique described above is used in connection with the closing of a container, e.g. a cup, whose opening edge or opening flange consists of oriented material. As a result the properties imparted to the material through orientation, and hence the properties of the container, are preserved also in the opening area at the same time as the closing of the container can be done by means of a detachable film or foil.

BRIEF DESCRIPTION OF THE ACCOMPANYING DRAWINGS

The invention is described in greater detail in connection with a number of figures, wherein FIG. 1 is a cross-section through a portion of oriented, plastic material, FIG. 2 is a cross-section corresponding to FIG. 1 where the plastic material has an upper fixing layer of substantially non-oriented material, FIG. 3 is a cross-section corresponding to FIGS. 1 and 2 where a mechanical heating means rests against the oriented material, FIG. 4 is a cross-section through a portion of plastic material with a beam transmitter or a burner nozzle directed towards one boundary surface of the plastic material, FIG. 5 is a cross-section where a film rests against the fixing layer and for the bonding of the film a mechanical means presses the film against the boundary surface, FIG. 6 is a cross-section of an opening part of a container limited by an upper flange whose surface facing upwards constitutes the upper boundary surface of a fixing surface and FIG. 7 is a cross-section corresponding to FIG. 5 where the opening part is provided with a closing film.

DESCRIPTION OF PREFERRED EMBODIMENTS

Figure 1:
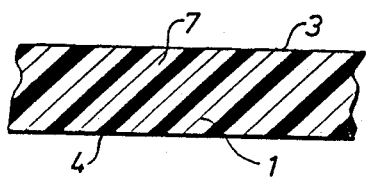

In the figures which show preferred embodiments of the invention FIG. 1 illustrates a portion 1 of plastic material 7 with an upper boundary surface 3 and a lower boundary surface 4. The plastic material is monoaxially or biaxially oriented.

Figure 2:
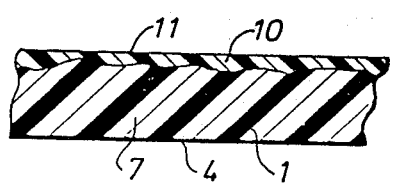

FIG. 2 shows a cross-section corresponding to FIG. 1 through the portion 1 of plastic material, but there the plastic material forms two layers 7 and 10 respectively, the layer 7 corresponding to the major portion of the oriented plastic material according to FIG. 1 and the other layer 10 corresponding to the remaining part of the oriented material in the portion 1 which has been converted so as to constitute an upper layer of substantially non-oriented material, referred to as a rule hereinafter as fixing layer 10. The outer boundary surface of the fixing layer corresponds to the upper boundary surface 3 in FIG. 1 and is designated by reference numeral 11.

Figure 3:
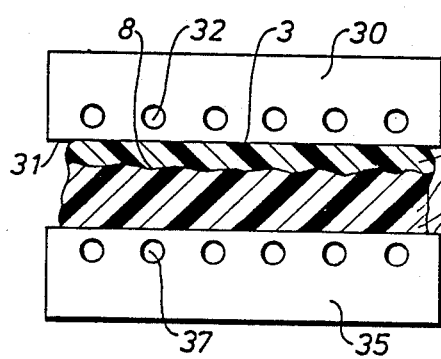

FIG. 3 shows a mechanical heating means 30 provided with ducts 32 for the transport of a heat transfer medium. The heating means has a contact surface 31 facing towards a holding-up means 35 whose contact surface facing towards the heating means is designated by reference numeral 36. The holding-up means is provided with ducts 37 for the transport of a heat transfer medium. The material portion 1 rests against the contact surface 31 of the heating means 30 for the transfer of heating energy to the material portion. The irregular line in the portion 1 marks a transition area 8 between material which is heated the heating means 30 and material which is not heated.

Figure 5:
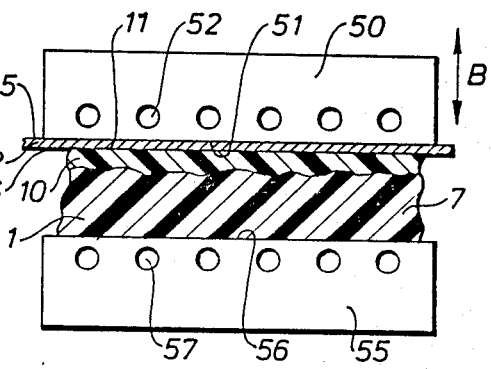

In FIG. 5 is shown an arrangement corresponding to that in FIG. 3 where a mechanical compression and heating means 50 and a holding-up means 55 are included in the arrangement, both provided with ducts 52 and 57 respectively, for the transport of heat transfer medium. The reference numerals 51 and 56 denote the contact surfaces facing one another of the compression and heating means 50 and of the holding-up means 55, respectively.

Between the compression and heating means 50 and the holding-up means 55 is to be found a portion 1 of plastic material consisting of a layer 7 of oriented plastic material and a fixing layer 10 integrated therewith of substantially non-oriented material.

In FIGS. 3 and 5 the arrows A and B respectively, indicate that the heating means 30 and the compression and heating means 50 respectively, are movable towards and away from one another by driving means (not shown in the Figures) between the opening position and the operating position shown in the Figures. It is evident to those versed in the art that alternatively the holding-up means 35 and 55 may be provided with driving means for movement corresponding to what has been described for the means 30, 50 and/or that the heating means as well as the holding-up means may be adapted for relative movement so as to occupy positions corresponding to the opening positions or operating positions.

In FIG. 5 the portion 1 is shown according to FIG. 2 constituted of the layer 7 of oriented plastic material and the layer 10 (the fixing layer) of substantially non-oriented material. A foil or film 2, hereinafter generally referred to as film, is placed between the contact surface 51 of the mechanical compression and heating means 50 and the fixing layer 10 and thus rests against the contact surface 11 of the fixing layer. One boundary surface 5 of the film faces towards the compression and heating means whereas the other boundary surface 6 faces towards the fixing layer 10.

Figure 4:
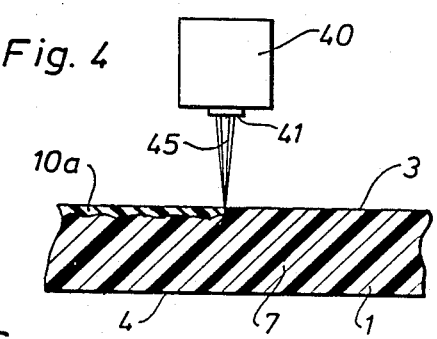

FIG. 4 shows a heating means 40 provided with a lens 41 for the converging of a beam 45, for example, of e.g. light towards the surface 3 of the portion 1 of oriented material situated at a distance. The radiation is of a frequency or a composition selected so that the plastic material substantially prevents the radiation from passing through it. As a rule the lens 41 is of a design selected so that the beam refracted towards the surface 3 of the portion 1 is of a bandlike appearance. The heating means 40 and the portion 1 are adapted to be moved by driving means (not shown in the Figures) in relation to one another whilst largely maintaining the concentration of the beams 45 against the boundary surface 3 of the portion 1. The reference numeral 10a denotes the fixing layer of substantially non-oriented material in the process of its formation.

In certain applications, the heating means 40 is constituted of a burner, e.g. a gas burner, from which originates a flame 45 directed towards the portion 1 of oriented plastic material.

Figure 6:
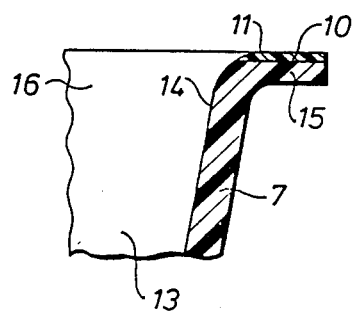
Figure 7:
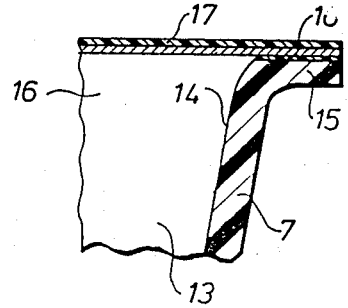

FIGS. 6 and 7 show a cross-section through the opening area of a container 13. The container has an opening part 16 provided with an annular opening area 14 of oriented material 7 which is delimited by the fixing layer 10 of substantially non-oriented material with a fixing surface 11. In a preferred application, the annular opening area 14 is designed to have an opening edge flange 15. In certain applications, the opening edge flange is absent when the opening edge is finished by a layer of substantially non-oriented material forming the fixing layer of the opening part. FIG. 7 shows how a film or foil 17 is bonded to the fixing layer 10 for the tight closing of the container.

In the application of the invention, in a preferred embodiment of the same, the fixing layer 10 is formed so that the oriented plastic material 7 at the prospective fixing surface 11 is heated to a temperature in the region of, or exceeding, the temperature at which the orientation of the material commences to be reduced. In the case of PET e.g. the preferred embodiment, the contact surface of the heating means 30 is at a temperature exceeding 190° C. In applications where the fixing layer should consist of substantially amorphous material, the material is heated to melting, the heating means being at a temperature which, at least slightly, exceeds the melting temperature of the material. In the process a layer of the material which had been oriented before the heating is converted to a substantially non-oriented material which forms the fixing layer 10. As a rule the heating time is limited so that the higher temperature is attained only in a relatively thin area of material which in cross-section will thus be continued by oriented material.

The heating for the formation of the fixing layer 10 described in the foregoing section takes place in certain embodiments with the help of the mechanical heating means 30, whereas in other embodiments the radiation means or the burner is used. In certain embodiments a heating means designed as a cylinder corresponding to the mechanical heating means 30 shown in FIG. 3 is employed. The foil or film or alternatively the oriented material area roll over the cylinder so as to be heated locally for the formation of the fixing layer 10. As a rule the environment provides sufficient cooling to cool the fixing layer rapidly to a temperature so low that the material becomes substantially amorphous. In certain applications where a relatively thick fixing layer is required, the equipment is supplemented by a means for the forced cooling of the heated fixing layer. Such a cooling is effected in certain applications by a jet or curtain of cool air whereas in other applications the material provided with fixing layer passes a cooling cylinder.

The oriented material area and the film (foil) thereafter is placed between the holding-up means 55 and the compression and heating means 50 when at least the oriented material area or the film, at least in the prospective fixing area, are delimited by the fixing layer 10. The placing of the same is such that it forms the boundary of the material area or of the film where the material area and the film rests against one another. The compression and heating means 50 and the holding-up means 55 are then moved towards one another so that the film 2 is pressed by the heating means against the material area at the same time as heat is supplied from the means 50. The fixing layer 10 on the material area or the film causes the film to stick to the material area and form the desired bond with the substantially non-oriented plastic material. For the fastening of the film to the actual material portion, the material or the film in certain applications is coated with an adhesive whose fixing effect is activated upon supply of heat. In certain applications, the heating means 30, with the help of which the fixing layer 10 is formed, is replaced by the compression and heating means which, in a first operating step rests directly against the upper boundary surface 3 of the portion 1 for the formation of the fixing layer 10, whereupon the contact ceases as the means and the material portion 1 are moved in relation to one another so that the distance of the means to the boundary surface (fixing surface) 11 is increased in order to allow insertion of the film 2. In a second step the compression and heating means 50 is used for the joinder of the film to the fixing layer 10 according to the technique described above.

The basic technique illustrated in FIGS. 3 and 5 for the joining of the film to a base of oriented material, which has been provided with the fixing layer 10, is also applicable, of course, to the embodiments shown in FIGS. 6 and 7 where the fixing layer 11 constitutes a boundary of an annular opening area 14 on a container. The technique thus makes it possible to join, by conventional methods, the film 17 to the opening edge of container 13 also in applications were the opening edge mainly consists of oriented material 7.

In accordance with the invention, the effect of the energy supply or the intensity of the radiation is relatively great. Since the plastic material has a relatively small thermal conductivity a rapid heating of material occurs in an area near the surface of the layer (the prospective fixing surface) at the same time as the low thermal conductivity gives rise to a great temperature gradient in relation to the underlying oriented material. The supply of energy is stopped after a period which is determined by the thermal conductivity of the material and as a rule is chosen so that only a thin layer of material below the fixing surface, referred to earlier as the fixing layer, attains temperatures so high that the orientation of the material is substantially cancelled. The remaining part of the material, seen in a cross-section there-through, is heated only to a small extent and therefore retains its orientation, and constitutes a dimension-determining support layer for the fixing layer. Since the orientation of the supporting layer remains intact, the properties of the supporting layer concerning strength, thermal resistance, dimensional stability etc. are also determining for a product on which a film is attached to the supporting layer in accordance with the procedure specified above.

In applications where it is desired that the material in the fixing layer should consist mainly, or at least in the area adjoining the fixing surface, of substantially amorphous material or of material with low thermal crystallization, the heating of the fixing layer is affected so that the material melts whereupon the material in the fixing layer, immediately after the heating, is cooled rapidly to a temperature below the crystallization temperature. This is done, for example, by the use of mechanical means which are in contact with the material of the fixing layer and which at least in the contact areas consist of material znes of good thermal conductivity. With the help of cooling ducts, these material zones on the mechanical means are kept at a low temperature, for example, 0° C.

The technique is also usable in applications where e.g. an aluminum layer is provided with a layer of material suitable after heating to constitute a bonding agent between the aluminum foil and the opening edge of the container.

In certain applications it is permissible for the fixing layer, seen in cross-section, to consist at least partly of crystallized material. Especially in an area of the fixing layer which in cross-section lies relatively far away from the fixing surface the poor thermal conductivity of the material entails that the heated material retains a temperature suitable for crystallization for such a long time that the thermal crystallization continues so long that in certain applications the material in this area becomes opaque.

The technique in accordance with the invention is also applicable of course when a film or a foil of oriented material needs to be provided with a fixing layer of substantially non-oriented material. This embodiment of the invention is particularly appropriate for a wafer of relatively great thickness and especially in applications where an opening edge of the container consists of a material, and is of a design, which makes it possible to allow energy from the compression and heating means to pass through the material of the opening edge to the material of the film adjoining the contact surfaces between the film and the opening edge.

In the preceding description, reference was made to a limited number of embodiments of the invention only, but it will be readily evident to those versed in the art that the invention embraces a large number of embodiments within the scope of the following claims.

We claim:

1. A container of thermoplastic material comprising a body of oriented thermoplastic material having an opening and including an annular portion surrounding said opening, a film joined to said annular portion to close said opening and a layer of non-oriented thermoplastic material between said film and said oriented thermoplastic material of aid annular portion for joining said film to said annular portion.

2. A container as claimed in claim 1, wherein said film is detachably joined to said layer.

3. A container as claimed in claim 1, wherein said annular portion comprises a flange, said layer being formed in said flange coextensively therewith.

4. A container as claimed in claim 3 wherein said flange has an upper surface, said layer being formed at said upper surface and being relatively thin compared to the thickness of said flange, said film being joined to said layer at said upper surface.

5. A container as claimed in claim 1, wherein said layer of non-oriented material is integral with and formed of the thermoplastic material of said annular portion of said body.

6. A container as claimed in claim 5 wherein said layer of non-oriented material is constituted as a relatively thin part of said annular portion, the non-orientation of the material of said layer being the product of heating the oriented material in said body to a determined temperature in said layer at which the material becomes non-oriented.

* * * * *